United States Patent
Gupta (10) Patent No.: US 11,699,012 B2
(45) Date of Patent: Jul. 11, 2023

(54) COVERAGE BASED MICROELECTRONIC CIRCUIT, AND METHOD FOR PROVIDING A DESIGN OF A MICROELECTRONIC CIRCUIT

(71) Applicant: MINIMA PROCESSOR OY, Oulu (FI)

(72) Inventor: Navneet Gupta, Oulu (FI)

(73) Assignee: Minima Processor Oy, Espoo (FI)

(*) Notice: Subject to any disclaimer, the term of this patent is extended or adjusted under 35 U.S.C. 154(b) by 92 days.

(21) Appl. No.: 17/297,623

(22) PCT Filed: Nov. 27, 2018

(86) PCT No.: PCT/FI2018/050857
§ 371 (c)(1),
(2) Date: May 27, 2021

(87) PCT Pub. No.: WO2020/109647
PCT Pub. Date: Jun. 4, 2020

(65) Prior Publication Data
US 2022/0027541 A1   Jan. 27, 2022

(51) Int. Cl.
*G06F 30/3312* (2020.01)
*G06F 30/394* (2020.01)
(Continued)

(52) U.S. Cl.
CPC ........ *G06F 30/3312* (2020.01); *G06F 30/394* (2020.01); *H03K 5/13* (2013.01);
(Continued)

(58) Field of Classification Search
USPC ........................................................ 716/113
See application file for complete search history.

(56) References Cited

U.S. PATENT DOCUMENTS 10,002,891 B2   6/2018  Yamazaki et al.
10,503,861 B1*  12/2019 Gaitonde .............. G06F 30/392
(Continued)

FOREIGN PATENT DOCUMENTS

| EP | 2 662 791 A1 | 11/2013 |
| TW | 201705111 A | 2/2017 |
| WO | WO-2018/193150 A1 | 10/2018 |

OTHER PUBLICATIONS

Sadi, M. et al., *A robust digital sensor IP and sensor insertion flow for in-situ path timing slack monitoring in SoCs*, IEEE 33$^{rd}$ VLSI Test Symposium (VTS) 2015, IEEE, 2015, pp. 1-6, <DOI:10.1109/VTS.2015.7116292>.

(Continued)

*Primary Examiner* — Mohammed Alam
(74) *Attorney, Agent, or Firm* — Alston & Bird LLP (57) ABSTRACT

Microelectronic circuit com-prises a plurality of logic units and register circuits, arranged into a plu-rality of processing paths, and a plu-rality of monitoring units associated with respective ones of said processing paths. Each of said monitoring units is configured to produce an observation signal as a response to anomalous opera-tion of the respective processing path. Each of said plurality of logic units belongs to one of a plurality of delay classes according to an amount of delay that it is likely to generate. Said de-lay classes comprise first, second, and third classes, of which the first class covers logic units that are likely to generate longest delays, the second class covers logic units that are likely to generate shorter delays than said first class, and the third class covers logic units that are likely to generate shorter delays than said second class. At least some of said plurality of pro-cessing paths comprise logic units be-longing to said second class but are without monitoring units. At least some of said plurality of processing paths comprise logic units belonging to said third class but have monitoring units associated with them.

14 Claims, 4 Drawing Sheets

(51) Int. Cl.
*H03K 5/13* (2014.01)
*H03K 5/19* (2006.01)
*G06F 119/12* (2020.01)
*H03K 19/20* (2006.01)

(52) U.S. Cl.
CPC ............ *H03K 5/19* (2013.01); *G06F 2119/12* (2020.01); *H03K 19/20* (2013.01)

(56) References Cited

U.S. PATENT DOCUMENTS

| | | | |
|---|---|---|---|
| 10,540,463 B1 * | 1/2020 | Chandrasekar | G06F 30/327 |
| 10,963,613 B1 * | 3/2021 | Wu | G06F 30/34 |
| 2022/0027541 A1 * | 1/2022 | Gupta | G06F 30/392 |

OTHER PUBLICATIONS

Dixus, A. et al., A deep-submicron CMOS flow for general-purpose timing-detection insertion. In: $22^{nd}$ International Conference Mixed Design of integrated Circuits & Systems (MIXDES) 2015, 2015, pp. 248-253 <DOI: 10.1109/MIXDES.2015.7208520>.

International Search Report and Written Opinion for PCT/FI2018/050857 (ISA/FI) dated Oct. 28, 2019 (11 pages).

Extended European Search Report for European Application No. 18941730.6 dated Jun. 17, 2022 (12 pages).

Taiwan Intellectual Property Office, Examination Report received for Application No. 108140096, dated Mar. 20, 2023, 7 pages, Taiwan.

* cited by examiner

COVERAGE BASED MICROELECTRONIC CIRCUIT, AND METHOD FOR PROVIDING A DESIGN OF A MICROELECTRONIC CIRCUIT

CROSS-REFERENCE TO RELATED APPLICATIONS

The present application is a national phase entry of International Application No. PCT/FI2018/050857, filed Nov. 27, 2018, which is incorporated herein by reference in its entirety.

FIELD OF THE INVENTION

The invention is related to the technology of microelectronic circuits that comprise multiple processing paths. In particular the invention concerns a way in which the different classes of delay criticality of the processing paths can be taken into account.

BACKGROUND OF THE INVENTION

Processing paths in a microelectronic circuit go through logic units and register circuits, so that a register circuit stores the output value of a preceding logic unit at the rising or falling edge of a triggering signal (if the register circuit is a flipflop) or at a high or low level of the triggering signal (if the register circuit is a latch). A triggering edge or some other controlling event of the triggering signal defines an allowable time limit before which a digital value must appear at a data input of the register circuit to become properly stored. The allowable time limit is not necessarily the exact moment of the triggering edge, but defined in some relation to it due to physical effects such as the finite rate at which a voltage level can change.

Time borrowing in a microelectronic circuit means that a circuit element is temporarily allowed to borrow time from a subsequent stage, i.e. change a digital value later than expected, if the subsequent circuit element(s) on the same processing path can handle it without corrupting the data that is being processed. The occurrence of an instance of time borrowing should be detected as a timing event.

Monitor circuits are one way of detecting timing events. A monitor circuit is a circuit element or functionality added to or associated with a register circuit and configured to produce a timing event observation (TEO) signal as a response to a change in the input digital value that took place later than said allowable time limit. In addition to the actual monitor circuits the microelectronic circuit must comprise an OR-tree and/or other structures for collecting, processing, and analyzing the TEO signals from the monitor circuits.

Other kinds of monitoring units and methods exist. One example is the use of a replica path that simulates the amount of delay on an actual processing path. Known input signals can be fed into a replica path; the known construction of the replica path means that output signals of known kind should come out. If the output of a replica path is not what it should be, it is very probable that some digital values change late also on the actual processing path.

Monitoring, done in one way or another, may be combined for example with AVS (Advanced Voltage Scaling; sometimes also Adaptive Voltage Scaling), so that an increasing number of events detected in monitoring causes an increase in the operating voltage and vice versa. The number of detected events may also trigger other compensating actions, typically involving changes in the values of other operating parameters of the circuit, like the clock frequency for example, or temporarily changing the clock waveform.

A major drawback of circuit units used for monitoring is that they consume circuit area and operating power. Placing monitor circuits, replica paths and/or other monitoring units into a designed microelectronic circuit involves compromises. The more monitoring units, the better the coverage for detecting timing events, but simultaneously the more circuit area and operating power is consumed for other purposes than the one for which the microelectronic circuit was designed in the first place.

Knowledge about how circuit elements work allows the designer of a microelectronic circuit to make a delay distribution analysis that tells, how much delay each circuit element will cause to the data that proceeds through it. A straightforward guideline for placing monitoring units would involve categorizing the circuit elements into delay classes according to how long delays they will cause, and deciding to monitor only those circuit elements that belong to the longest delay class on the processing paths. However, that will provide only a partial solution to the problem, for a number of reasons.

First, individual variation between manufactured microelectronic circuits makes it uncertain, which circuit elements will actually be the critical ones. A circuit element that according to the delay distribution analysis belonged only the second or third longest delay class might actually be the most critical circuit element in a real-life manufactured circuit. Second, executed software might be such that—at least under certain circumstances—it does not use those processing paths that go through the most critical circuit elements for extended periods of time, so that the events that should be detected actually take place on those processing paths that were not deemed critical in the delay distribution analysis. Third, even if data is currently flowing through (also) the critical processing paths it may happen that for the moment that data contains extended sequences of constant (unchanging) digital values, which naturally makes the detection of any exceptional events on those paths impossible because such events can only occur when a digital value changes at the input of a register circuit.

Additional complexity to the task of designing a microelectronic circuit comes from the requirement of testability. The concept of DFT (Designed For Testability, or Design-For-Test) has become a de facto industrial standard that defines certain procedures for testing a microelectronic circuit. As an example, it should be possible to selectively couple the register circuits contained in the microelectronic circuit into long chains that operate essentially as shift registers: a string of digital values can be fed in from one end and read out from the other end. Passing a known test pattern through such a chain of register circuits and checking its form at the output tells whether all register circuits in the chain are changing their states as desired or whether there are register circuits that are stuck at some particular value (stuck-at fault test). An at-speed fault test involves feeding in a test pattern slowly at a low clock speed, then giving one or more clock pulses at the full operating speed so that the test pattern proceeds in the chain at functional logic speed by as many steps as there are clock pulses, and finally clocking the test pattern out again at a low clock speed. The at-speed test may give information about register circuits that are slower than intended. If there are monitor circuits and time borrowing capability involved, or other kinds of monitoring units, also these should be testable.

SUMMARY

An objective here is to present a microelectronic circuit that strikes an optimal balance between the number of monitoring units and the coverage thus obtained. Coverage means the proportion of processing paths that can be monitored for the occurrence of timing events.

Another objective is to present a method for producing a design of a microelectronic circuit that has the characteristic mentioned above.

Yet another objective is to ensure that the microelectronic circuit is compatible with standard DFT methodology, and capable of AVS.

These objectives are achieved by deciding at least some of the locations for placing monitoring units by considering the delay criticality of pieces of processing paths that go through two or more logic unit stages between register circuits.

According to a first aspect there is provided a microelectronic circuit that comprises a plurality of logic units and register circuits, said logic units and register circuits arranged into a plurality of processing paths. The microelectronic circuit comprises a plurality of monitoring units associated with respective ones of said processing paths, each of said monitoring units configured to produce an observation signal as a response to anomalous operation of the respective processing path. Each of said plurality of logic units belongs to one of a plurality of delay classes according to an amount of delay that it is likely to generate. Said delay classes comprise first, second, and third classes, of which the first class covers logic units that are likely to generate longest delays, the second class covers logic units that are likely to generate shorter delays than said first class, and the third class covers logic units that are likely to generate shorter delays than said second class. At least some of said plurality of processing paths comprise logic units belonging to said second class but are without monitoring units. At least some of said plurality of processing paths comprise logic units belonging to said third class but have monitoring units associated with them.

According to an embodiment said monitoring units comprise a plurality of monitor circuits associated with respective ones of said plurality of register circuits, each of said monitor circuits configured to produce a respective timing event observation signal as a response to a change in a digital value at an input of the respective register circuit that took place later than an allowable time limit defined by a triggering signal to said respective register circuit. At least some of the register circuits that on said processing paths follow logic units belonging to said second class are without monitor circuits, and at least some of said monitor circuits are associated with register circuits that on said processing paths follow logic units belonging to said third class. The use of monitor circuits involves the advantage that a control unit of the microelectronic circuit can be made aware of occurring timing events, and take appropriate measures.

According to an embodiment at least some of said processing paths are adaptive processing paths the performance of which is configurable by making an operating parameter of the microelectronic circuit assume an operating parameter value. The adaptivity of such processing paths makes it possible to use the monitoring for timing events to achieve savings in required operating power.

According to an embodiment the microelectronic circuit comprises a first signal-collecting circuit configured to collect at least the timing event observation signals produced by the monitor circuits associated with register circuits that on said processing paths follow logic units belonging to said first class. This involves the advantage of efficiently and timely conveying information about the occurred timing events to the knowledge of a controlling unit.

According to an embodiment said first signal-collecting circuit is configured to also collect the timing event observation signals produced by the monitor circuits associated with register circuits that on said processing paths follow logic units belonging to any other class than said first class. This involves the advantage that timing events can be reacted upon, independently of in which part of the circuit they occurred.

According to an embodiment the microelectronic circuit comprises a second signal-collecting circuit configured to collect the timing event observation signals produced by the monitor circuits associated with register circuits that on said processing paths follow logic units belonging to at least one of said second and third classes. This involves the advantage that the microelectronic circuit can be made to react in different ways depending on the part thereof in which timing events were observed.

According to an embodiment the microelectronic circuit is configured to collect timing event observation signals through said first signal-collecting circuit, collect timing event observation signals through said second signal-collecting circuit, adapt operation of at least a part of the microelectronic circuit by making an operating parameter of the microelectronic circuit assume operating parameter values according to a first adaptation rule in response to the timing event observation signals collected through said first signal-collecting circuit, and adapt operation of at least a part of the microelectronic circuit by making said operating parameter of the microelectronic circuit assume operating parameter values according to a second adaptation rule in response to the timing event observation signals collected through said second signal-collecting circuit. This involves the advantage of a specific way of adapting the operation of the microelectronic circuit depending on the part thereof in which timing events were observed.

According to an embodiment said first adaptation rule is based on a first number of timing event observation signals per unit time collected through said first signal-collecting circuit, and said second adaptation rule is based on a second, different number of timing event observation signals per unit time collected through said second signal-collecting circuit. This involves the advantage that different ways of reacting are possible depending on the frequency at which timing events are observed in parts that are more or less delay-critical.

According to an embodiment the microelectronic circuit comprises a test input arrangement configured to controllably feed test input signals consisting of test input values into a plurality of circuit elements of at least one of said processing paths, and a test output arrangement configured to controllably collect test output values from said plurality of circuit elements of said at least one of said processing paths. This involves the advantage that the microelectronic circuit can be made compatible with standard DFT methodology.

According to an embodiment the microelectronic circuit comprises an operating parameter value selector configured to select operating parameter values on the basis of collected test output values. This involves the advantage that test results can be made to affect the AVS behavior of at least part of the circuit.

According to an embodiment said test output arrangement is configured to selectively collect said test output values from at least one of: data outputs of said plurality of register circuits, timing event observation signal outputs of said plurality of monitor circuits. This involves the advantage that testing can be directed to desired parts of the microelectronic circuit.

According to an embodiment said test output arrangement is configured to controllably collect test output values coming from a piece of processing path on which intermediate stages comprise register circuits not associated with respective monitoring units and a subsequent stage comprises a register circuit associated with a respective monitoring circuit. This involves the advantage that the operation of multicycle critical paths may be tested.

According to an embodiment said test output arrangement is configured to controllably collect test output values coming from a piece of processing path on which at least one intermediate stage comprises a register circuit capable of time borrowing. This involves the advantage that the operation of a multicycle critical path may be tested irrespective of whether there are monitors associated with its intermediate stages.

According to an embodiment at least some of the monitoring units comprise replica paths configured to simulate the operation of a corresponding one of said plurality of processing paths with known input data. This involves the advantage that an alternative way exists for examining the operation of the circuit for timing events.

According to a second aspect there is provided a method for producing a design of a microelectronic circuit. The method comprises:

a) providing a first, preliminary design of said microelectronic circuit, said first design defining processing paths through logic units and register circuits within said microelectronic circuit, b) performing a delay distribution analysis of said first design to categorize said logic units into delay classes according to amounts of delay they are likely to generate, c) classifying a first subset of said logic units as delay critical logic units based on their appearance in one or more longest delay classes in said delay distribution analysis, d) producing a second, intermediate design of said microelectronic circuit by associating monitoring units with processing paths comprising said delay critical logic units, e) producing a third, further design of said microelectronic circuit by associating monitoring units with processing paths that comprise logic units not classified as delay critical logic units in step c) and that contain at least a threshold amount of processing path without an associated monitoring unit, and f) outputting said third design as said design of the microelectronic circuit.

According to an embodiment said threshold amount of processing path is defined as a number of register circuits without an associated monitoring unit through which register circuits the respective processing path goes. This involves the advantage that a robust and straightforward way is available for recognizing delay-critical paths of this kind.

According to an embodiment said threshold amount of processing path is defined as a total delay that circuit elements along the respective processing path are likely to generate according to said delay distribution analysis. This involves the advantage that a very flexible and accurate way is available for recognizing delay-critical paths.

According to an embodiment step d) comprises placing monitor circuits to register circuits that on said processing paths come after said delay critical logic units, and step e) comprises placing monitor circuits to register circuits that on said processing paths come after logic units that were not classified as delay critical logic units in step c) but that on said processing paths are preceded by at least said threshold amount of processing path without monitor-equipped register circuits. This involves the advantage that optimal positions can be found for monitor circuits.

According to an embodiment step e) comprises adding one or more signal-collecting circuits to collect signals from said monitor circuits that were placed to register circuits that on said processing paths come after logic units that were not classified as delay critical logic units in step c). This involves the advantage that a control unit of the microelectronic circuit can be made aware of occurring timing events, and take appropriate measures.

According to an embodiment step e) comprises associating monitoring units with processing paths that comprise a second subset of logic units not classified as delay critical logic units in step c) and that contain at least a first threshold amount of processing path without an associated monitoring unit, and associating monitoring units with processing paths that comprise a third subset of logic units not classified as delay critical logic units in step c) and that contain at least a second threshold amount, different than said first amount, of processing path without an associated monitoring unit. This involves the advantage that optimal locations can be found for placing monitoring units.

According to an embodiment associating a monitoring unit with a processing path comprises placing a monitor circuit to a register circuit on that processing path, and step e) additionally comprises adding a first signal-collecting circuit to collect signals from outputs of monitor circuits placed to register circuits following logic units of said second subset, and adding a second signal-collecting circuit to collect signals from outputs of monitor circuits placed to register circuits following logic units of said third subset. This involves the advantage that the microelectronic circuit can be made to react in different ways to timing events depending on the part thereof in which the timing events were observed.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

In the following, microelectronic circuits and methods for their designing and operating will be described. A typical microelectronic circuit comprises a plurality of logic units and register circuits, arranged into a plurality of processing paths. A processing path is a sequence of circuit elements through which digital data may pass, so that it gets processed in logic units and temporarily stored in register circuits that are located between consecutive logic units on said processing paths. The software that the microelectronic circuit executes defines, which processing paths are used at any given time and in which way.

In order to provide better understanding to some of the details explained later, an example of a register circuit is described with reference to FIG. 1. The register circuit of FIG. 1 comprises a first subregister stage 101 and a second subregister stage 102. The data input and data output of the first subregister stage 101 are marked as i1 and q1 respectively, and the data input and data output of the second subregister stage 102 are marked as i2 and q2 respectively. The data input D of the register circuit is coupled to the data input i1 of the first subregister stage 101 through a multiplexer 103, so that a high level of the control signal SE causes a test input SI to be coupled to the data input i1 of the first subregister stage 101 instead. The data output q2 of the second subregister stage 102 is coupled to the data output Q of the register circuit.

The register circuit comprises two triggering signal inputs for the triggering signals CP and CPD. The first-mentioned can be called here the clock signal. For reasons explained in more detail below the other triggering signal CPD is a delayed version of the clock signal CP, preferably so that the delay is not more than one half cycle of CP, and can thus be called the delayed clock signal. Depending on the value (low/high) of the control signal TTBEN, either the delayed clock signal CPD or the clock signal CP is coupled to the triggering signal input of the first subregister stage 101. The clock signal CP is coupled to the triggering signal input of the second subregister stage 102.

The register circuit comprises, or is associated with, a monitor circuit 105 that is configured to produce a timing event observation (TEO) signal as a response to a change in a digital value at the data input D of the register circuit that took place later than an allowable time limit. The time limit is defined by the clock signal CP and by the physical characteristics of the appropriate circuit elements. Simplified, the digital value at the data input D should just have assumed its appropriate value before a triggering edge in the clock signal CP, so that if a change that was supposed to come before the triggering edge comes after it, it is late. In practice there are factors like finite rising and falling times, which means that the allowable time limit is not exactly the moment of the triggering edge but typically slightly earlier. In some special cases it may be even slightly later.

The data input DM of the monitor circuit 105 receives a copy of what goes into the data input i1 of the first subregister stage 101. The clock pulse input CPP of the monitor circuit 105 receives a triggering signal that defines the allowable time limit after which a change in the digital value at the data input of the register circuit is late. The triggering signal received at the clock pulse input CPP may define the so-called TEO window, so that it defines also an end limit, after which the monitor circuit 105 does not react any more to a change in the input data.

At its timing event output TE the monitor circuit 105 is configured to produce the TEO signal. Here we may assume a signal level convention according to which the TEO signal is normally low, but goes high at the moment of observing a timing event and remains high until the end of the clock cycle during which the timing event was observed. With a suitable value of the control signal TMTEOH the monitor circuit 105 may be made to maintain the high value, once occurred, of the TEO signal longer than just until the end of the clock cycle. This function is useful for example in test mode, in which a maintained high value of the TEO signal may be collected for further processing and analysis.

The use of a delayed clock signal CPD as the triggering signal of the first subregister stage 101 makes the register circuit capable of time borrowing. In other words, a logic unit or other part of processing path that precedes this kind of a register circuit is temporarily allowed to cause a timing event, i.e. a late change of a digital value, because the register circuit of FIG. 1 can handle it without corrupting the data that is being processed. As long as the late-arriving change of digital value at the data input D comes before the triggering edge in the delayed clock signal CPD, it will get correctly stored in the register circuit. (To be quite exact, there are rising and falling times involved also here, so the ultimate limit is some allowable time limit defined by the delayed clock signal CPD, not necessarily the exact moment of the triggering edge thereof.) Time borrowing can be disabled by making the value of the control signal TTBEN high, in which case the clock signal CP is used as the triggering signal of the first subregister stage 101.

The data input i2 of the second subregister stage 102 receives either the value at the data output q1 of the first subregister stage 101 or the value at the TE output of the monitor circuit 105, depending on the value of the control signal TMSE that controls the multiplexer 106. Here it is assumed that the microelectronic circuit comprises a so-called common scan chain that is used to collect the digital values that the tested circuit elements produce during test mode. A high value of the control signal TMSE causes the output value of the monitor circuit 105 to be directed to the common scan chain, while a low value of TMSE directs the actual, temporarily stored digital value that went to the first and second subregister stages to the common scan chain. The control signal CDN to the second subregister circuit 102 is an asynchronous reset signal.

Figure 1:
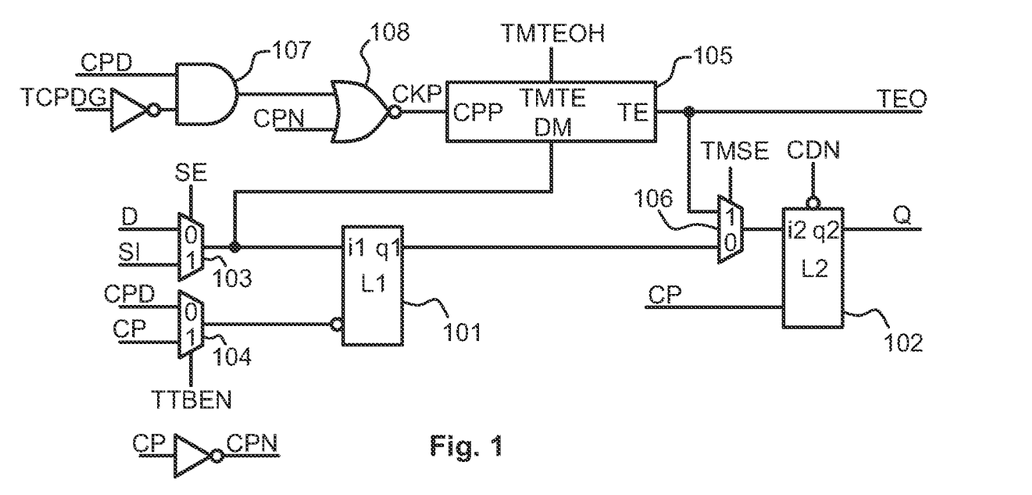
FIG. 1 illustrate schematically a register circuit.
Figure 2:
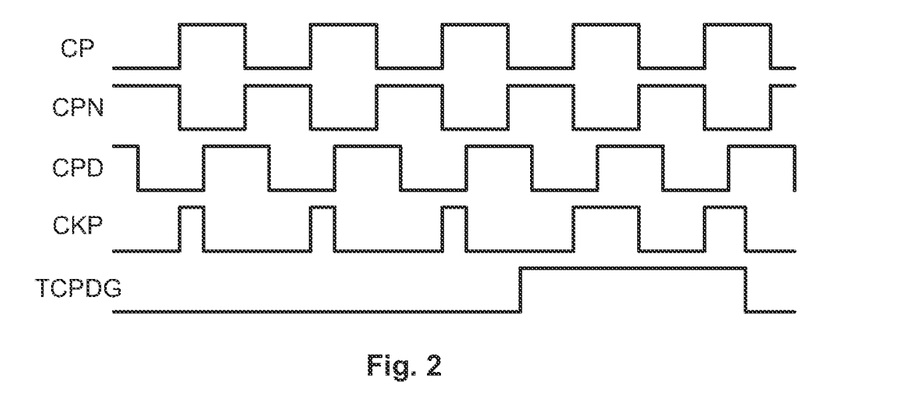
FIG. 2 illustrates waveforms of some signals in a register circuit of the kind shown in FIG. 1.

FIG. 1 illustrates one possible way of producing the triggering signal CKP that goes into the clock pulse input CPP of the monitor circuit. The associated waveforms are shown in FIG. 2. Normally the signal TCPDG is low and its inverse thus high, so the delayed clock signal CPD goes as such through the AND gate 107 to one input of the NOR gate 108. The other input of the NOR gate receives an inverse CPN of the clock signal CP. The triggering signal CKP that goes into the triggering input CPP of the monitor circuit 105 is high for the duration between rising edges in the clock and delayed clock signals CP and CPD. When the signal TCPDG goes high, its inverse goes low, and the output of the AND gate 107 remains low. This makes the triggering signal CKP and inverse of the inverted clock signal CPN, i.e. equal to the clock signal CP.

The exact way in which the monitor circuit 105 is implemented internally is of lesser importance, as long as it is capable of performing the functions described in this text. Examples of physical implementations of monitor circuits are found for example in the patent application number PCT/FI2017/050290.

Figure 3:
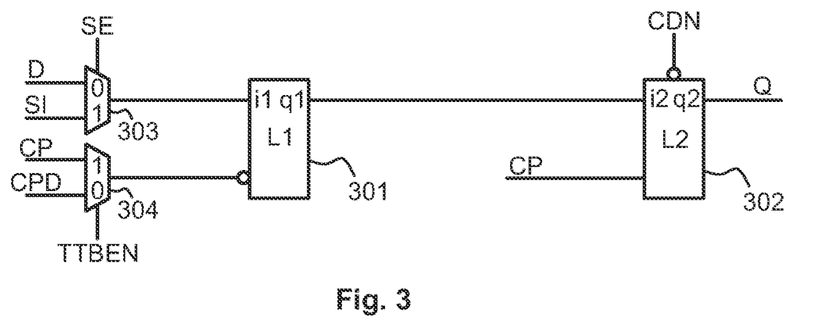
FIG. 3 illustrates schematically a register circuit.

For providing some further understanding to some of the details explained later, another example of a register circuit is described with reference to FIG. 3. The register circuit of FIG. 3 is capable of time borrowing but does not comprise, or is not associated with, a monitor circuit. It shares with the register circuit of FIG. 1 the existence of a first subregister stage 301 and a second subregister stage 302 in series between the data input D and data output Q, as well as two multiplexers 303 and 304. The first multiplexer 303 is used to couple, depending on the value of the control signal SE, either a data input D or a test input SI to the data input i1 of the first subregister stage. The second multiplexer 304 is used to couple, depending on the value of the control signal TTBEN, either the clock signal CP or the delayed clock signal CPD to the (inverting) triggering signal input of the first subregister stage 301. The clock signal CP is coupled to the triggering signal input of the second subregister stage 302, and an asynchronous reset signal CDN is coupled to a control input of the second subregister stage 302.

The polarities at the second multiplexer 304 are such that a high value of the control signal TTBEN disables time borrowing by making the clock signal CP the triggering signal of the first subregister stage 301, while a low value thereof enables time borrowing by making the delayed clock signal CPD the triggering signal of the first subregister stage 301. Since there is no monitor, any occasions where the time borrowing capability was actually used will not cause any detected timing events. This kind of register circuits may still have particular use, as will be described in more detail later in this text.

Figure 4:
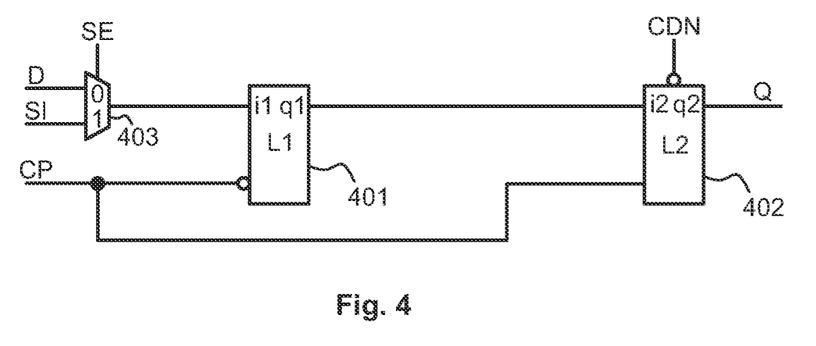
FIG. 4 illustrates schematically a register circuit.

For the sake of comparison FIG. 4 illustrates a register circuit that is testable but does not support time borrowing. The same triggering signal CP clocks the both subregister stages 401 and 402. If the digital value at the data input D changes late, i.e. only after the allowable time limit defined by the triggering signal CP, it will not get properly stored in the register circuit of FIG. 4. The multiplexer 403 can be used to couple a test input SI into use instead of the data input D.

Any of the register circuits of FIGS. 3 and 4 could be associated with a monitor circuit; as an alternative characterization, a monitor circuit could be placed to any of the register circuits of FIG. 3 or 4. In this meaning a monitor circuit is a circuit configured to produce a respective timing event observation signal as a response to a change in a digital value at an input of the respective register circuit that took place later than an allowable time limit defined by a triggering signal to the respective register circuit. A timing event is an example of an anomalous operation of the respective processing path, because normally all circuit elements on the processing path should ensure that any change in digital value proceeds through the processing path according to the timing defined by the appropriate triggering signals.

Figure 5:
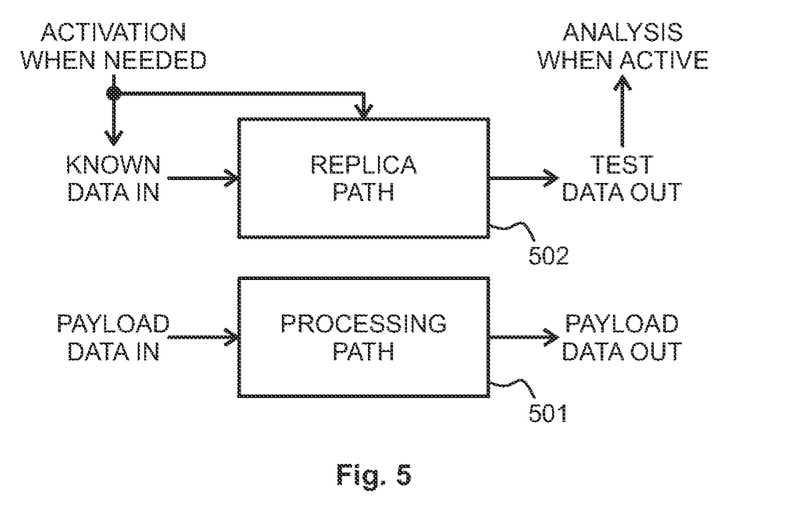
FIG. 5 illustrates schematically the use of a replica path.

The use of monitor circuits to detect timing events is not the only way of detecting anomalous operation of a processing path. An example of another way is schematically shown in FIG. 5. Here it is assumed that a microelectronic circuit comprises a plurality of processing paths, one of which is shown as processing path 501 in FIG. 5. The microelectronic circuit comprises a so-called replica path 502, the task of which is to simulate the operation of the processing path 501 but with known input data. The processing of the known input data in the replica path 502 should give rise to a known form of the test data that comes out of the replica path 502. If the test data coming out differs from what it should be, the replica path operates in some anomalous way. Thus it can be assumed, with reasonable probability, that also the "actual" processing path 501 operates anomalously under the same operating conditions, i.e. under the influence of the same values of operating parameters like operating voltage, clock frequency, and the like.

The use of monitor circuits associated with register circuits, the use of replica paths, and other similar arrangements can be generally described so that there are monitoring units associated with respective ones of the processing paths. Each such monitoring unit is configured to produce an observation signal as a response to anomalous operation of the respective processing path. In the case of monitor-equipped register circuits the monitoring unit is the monitor circuit, and the observation signal is a timing event observation signal. In the case of replica paths the monitoring unit is the replica path together with the circuit element analyzing its output, and the observation signal is one that indicates that the output of the replica path was not what it should have been.

The use of monitor circuits, like in FIG. 1, does not require the corresponding register circuit to be capable of time borrowing. In some cases the produced TEO signal can be used elsewhere in the microelectronic circuit to ignore or filter the output data from a register circuit that received its input data late as indicated by the TEO signal. There are even applications in which the output data can be let to pass irrespective of some uncertainty about whether or not it was appropriately stored despite its late arrival. For example if the processed data represents a video signal meant for a human user to watch, some noise in the data can be accepted because it will be barely noticeable in the reproduced video image.

Figure 6:
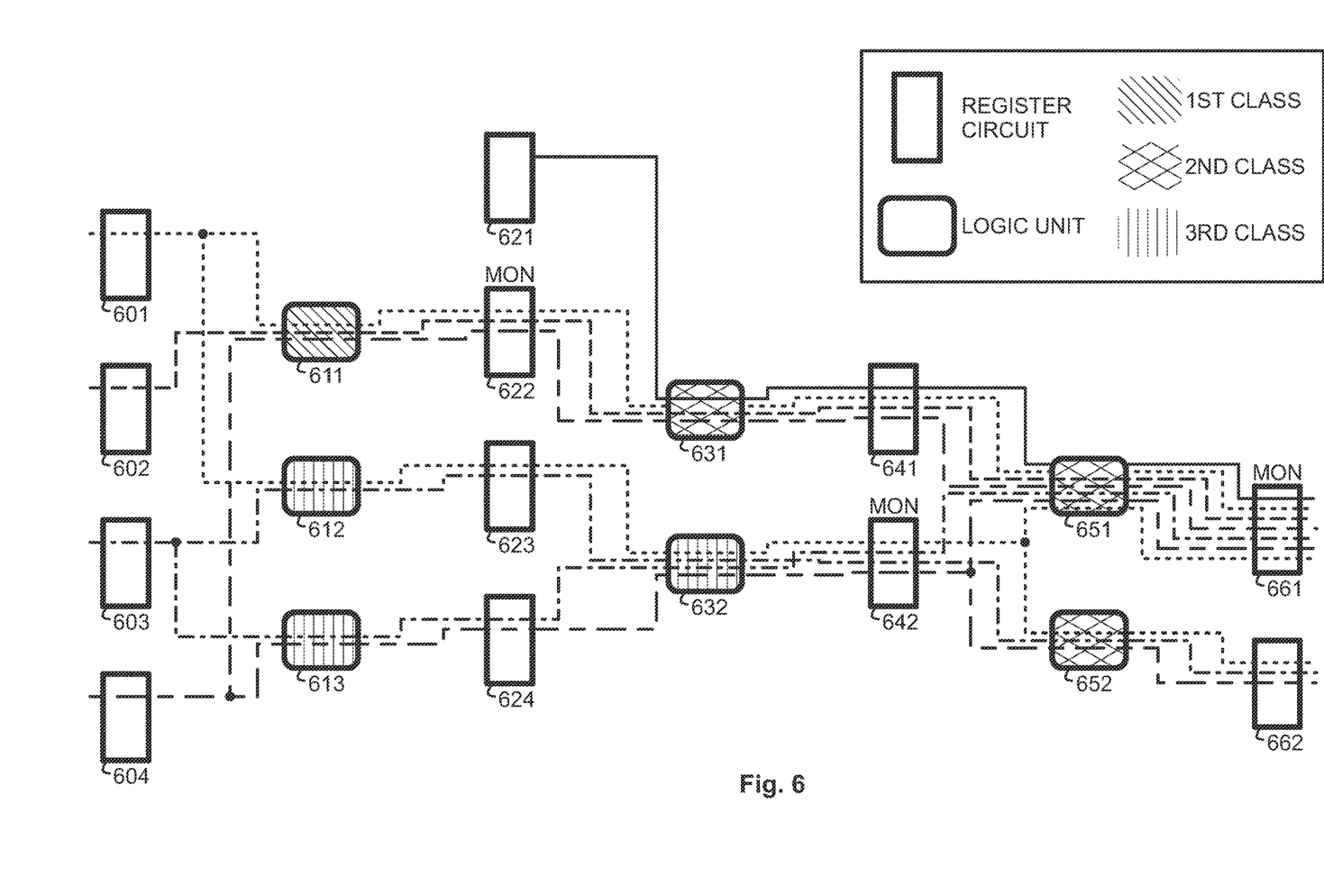
FIG. 6 illustrates schematically a part of a microelectronic circuit.

FIG. 6 is a schematic illustration of a part of a microelectronic circuit. It comprises a plurality of logic units shown as rounded rectangles, and a plurality of register circuits shown as sharp-cornered rectangles. These are arranged into a plurality of processing paths, shown in FIG. 6 as lines that propagate from the left to the right. For example the processing path that comes through the register circuit 602 on the left is shown to continue through the logic unit 611, register circuit 622, logic unit 631, register circuit 641, logic unit 651, and register circuit 661.

The microelectronic circuit comprises a plurality of monitoring units associated with respective ones of the processing paths. Each of said monitoring units is configured to produce an observation signal as a response to anomalous operation of the respective processing path. Of the possible alternative approaches outlined above, FIG. 6 illustrates the use of monitor circuits that are associated with respective ones of the plurality of register circuits. The expression "associated with" covers all possible ways in which the monitor circuit in question is configured to monitor just that register circuit for the occurrence of timing events.

Not all register circuits of the microelectronic circuit of FIG. 6 have a monitor circuit associated therewith. Those that have are marked with the text MON in FIG. 6: these are register circuits 622, 642, and 661. Each monitor circuit is configured to produce a respective timing event observation signal as a response to a change in a digital value at an input of the respective register circuit that took place later than an allowable time limit defined by a triggering signal to said respective register circuit.

Each of the logic units shown in FIG. 6 belongs to one of a plurality of delay classes according to an amount of delay that it is likely to generate. The delay is the amount of time it takes for the output of the logic unit to assume the appropriate value after the respective input values have become available for the logic unit. The designer of a microelectronic circuit can use any of a variety of analyzing tools to produce a calculated estimate of the amount of delay that a logic unit is expected to generate. The process of estimating the delays may be called a delay distribution analysis.

The delay classes may comprise at least first, second, and third classes. In practice there can be any number of such classes, but these three classes are used here as an example. The first class covers logic units that according to the analysis are likely to generate longest delays. The second class covers logic units that are likely to generate shorter delays than the first class, and the third class covers logic units that are likely to generate shorter delays than the second class.

The concept of delay classes is used here as an umbrella concept that covers all ways in which the analyzed circuit elements can be partitioned, or allocated, or fractioned on the basis of the amount of delay they are likely to generate. In view of the possible generation of timing events during operation, logic units in the first class, i.e. those that are expected to generate the longest delays, are the most critical. Therefore when the placing of monitor circuits is considered, any register circuits that on at least one processing path follow a logic unit belonging to the first class should be the most probable candidates to get a monitor circuit associated therewith. Here "following" means immediate following, i.e. a relationship where the register circuit in question is the one into which the output value of the logic unit of first class should be temporarily stored at the next triggering edge of the triggering signal.

The part of a microelectronic circuit shown in FIG. 6 comprises only one logic unit belonging to the first class, namely logic unit 611. All processing paths going through logic unit 611 go next to register circuit 622. In other words, register circuit 622 follows the logic unit 611 on all processing paths. Therefore a monitor circuit is associated with the register circuit 622.

A characteristic feature of the microelectronic circuit of FIG. 6 is that at least some processing paths comprise logic units belonging to the second class but are without monitoring units, while at least some processing paths comprise logic units belonging to the third class but have monitoring units associated with them. This feature is described in more detail in the following.

A monitor circuit is also associated with register circuit 642 that follows logic unit 632 on all those processing paths that go through said logic unit, although logic unit 632 belongs to the third class, and although at least some of the register circuits that on the respective processing paths follow logic units belonging to the second class are without monitor circuits (see logic units 631 and 652, followed by register circuits 641 and 662). The logical explanation for this is that monitor circuits have been placed in the design of the microelectronic circuit by taking into account the amount of processing path that precedes each register circuit. The amount of processing path may be defined as a number of register circuits through which the respective processing path goes. Additionally or alternatively the amount of processing path may be defined as a total delay that circuit elements along the respective processing path are likely to generate according to a delay distribution analysis.

Figure 7:
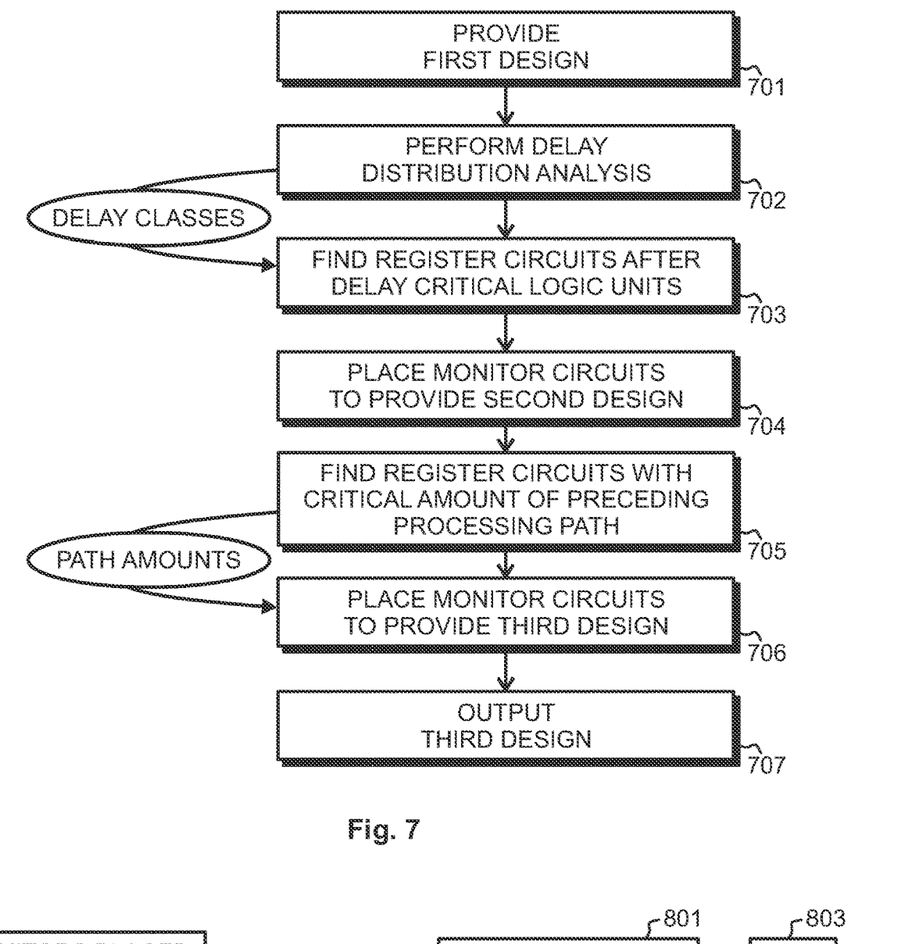
FIG. 7 illustrates schematically a method.

FIG. 7 illustrates schematically a method for producing a design of a microelectronic circuit, which method adheres to the principles outlined above. Step 701 represents providing a first, preliminary design of the microelectronic circuit. This first design defines processing paths through logic units and register circuits within the microelectronic circuit.

Step 702 represents performing a delay distribution analysis of the first design. The aim of the delay distribution analysis is to categorize the logic units of the microelectronic circuit into delay classes according to amounts of delay that they are likely to generate. As a result of step 702, logic units in the microelectronic circuit to be designed are known to belong to particular delay classes.

Step 703 represents classifying a subset of the logic units of the microelectronic circuit to be designed as delay critical logic units. This subset can be called the first subset for nomenclatural consistency, and the classification is based on their appearance in the one or more longest delay classes in the delay distribution analysis. The expression "one or more longest delay classes" refers to the fact that although in the description of FIG. 6 above it was suggested that only logic units of the first class would be automatically considered critical, the designer of the microelectronic circuit may decide that all logic units belonging to the N longest-delay classes are critical, where N is a positive integer. Comparing to FIG. 6 we may assume that here N=1.

Step 704 represents producing a second, intermediate design of the microelectronic circuit by associating monitoring units with processing paths comprising the delay critical logical units. In the approach of FIG. 6 this means placing monitor circuits to the delay critical register circuits found in step 703: the monitor circuit associated with register circuit 622 is placed in step 704.

Step 705 represents finding logic units that were not classified as delay critical above but that are located on processing paths that contain at least a threshold amount of processing path without an associated monitoring unit. In the approach of FIG. 6 this is synonymous with finding register circuits (immediately) following logic units of classes 2 or 3, preceded by at least a threshold amount of processing path without monitor-circuit-equipped register circuits. Step 706 represents producing a third, further design of the microelectronic circuit by associating monitoring units with the processing paths found this way. Again referring to FIG. 6, this means placing monitor circuits to register circuits following logic units of classes 2 or 3, preceded by at least a threshold amount of processing path without monitor-circuit-equipped register circuits. In other words, this means placing the monitor circuits to register circuits 642 and 661. Step 707 represents outputting the third design as the result of the method.

Above it was already pointed out that one way to define what is a critical amount of preceding processing path is to define it as a number of register circuits without an associated monitoring unit through which the respective processing path goes. Comparing to FIG. 6, we may assume that this so-called step size is two. Thus for example a monitor circuit has been placed to register circuit 642 because there are processing paths going through it that go through two preceding register circuits without monitors: for example the processing path through circuit elements 601, 612, 623, and 632; or the processing path through circuit elements 604, 613, 624, and 632. A monitor has been placed to register circuit 661 because there is one processing path (coming through circuit elements 612, 631, 641, and 651) through it that goes through two preceding register circuits without monitors.

Another way to define what is a critical amount of preceding processing path is to define it as a total delay that circuit elements along the respective processing path are likely to generate according to the delay distribution analysis. Also this kind of a definition could have produced the design of a microelectronic circuit as in FIG. 6. For example, even if the logic units 612 and 632 are both fast enough to belong to the third delay class, the sum of the delays that they are expected to generate may be larger than the threshold amount of delay that becomes critical. Thus the total delay that the circuit elements along e.g. the processing path 603-612-623-632 may be large enough to justify placing a monitor to the register circuit 642.

Defining the critical amount of processing path as a total delay, rather than as just a number of steps through preceding register circuits without monitors, may be referred to as finding the MCCPs (Multi-Cycle Critical Paths). An MCCP is a piece of processing path that goes through certain circuit elements, so that the time it takes for a piece of digital data to pass through these circuit elements is two or more clock cycles. In particular, the word "critical" in the name indicates that the total delay that these circuit elements are likely to generate along the MCCP is longer than a threshold.

It should be noted that the definition of an MCCP is not bound to how the rising and falling edges that occur in the triggering (clock) signals. Register circuits like those in FIGS. 1, 3, and 4 are single-edge triggered: the actual value of digital data at the input is stored into the register circuit at each rising edge of the triggering signal. If all register circuits in the processing paths in question are of such type, all delays may be expressed as multiples of one clock cycle. If there are other kinds of register circuits, such as dual-edge triggered flip-flops, latches, pulsed latches, and/or the like, the evaluation of delays must take that into account.

A more general case of an MCCP may be characterized as a Multiple Control Event Critical Path, in which the evaluation of delays must take into account also processing paths on which the propagation times between circuit elements may be non-integer multiples of the clock cycle. For example if the register circuits are single-edge triggered flip-flops, passing data through an MCCP that is three control events long requires three clock cycles. If the register circuits are dual-edge triggered flip-flops or latches, passing data through an MCCP that is three control events long requires one and a half clock cycles.

In order to take advantage of the TEO signals that the monitor circuits can produce in those embodiments where monitor circuits are used, signal-collecting circuits should be added. Following the principle shown schematically in FIG. 8, a first signal-collecting circuit 801 may be configured to collect at least the TEO signals produced by the monitor circuits associated with the delay critical register circuits. These are the register circuits that on the processing paths follow logic units belonging to the first class, i.e. the logic units expected to generate longest delays. A second signal-collecting circuit 802 may be configured to collect the TEO signals produced by the monitor circuits associated with other register circuits. These are the register circuits that on the processing paths follow logic units belonging to the second and/or third classes. An example of a signal-collecting circuit is an OR tree that produces an indication of a timing event having been detected if at least one TEO signal goes high in any of the monitor circuits connected to that OR tree.

Figure 8:
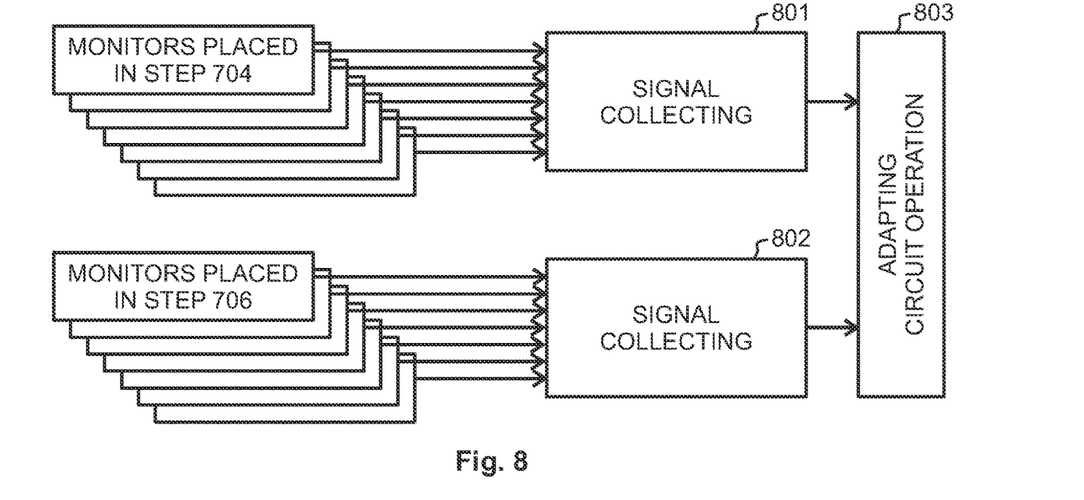
FIG. 8 illustrates schematically the principle of using signal-collecting circuits for adapting the operation of the microelectronic circuit.

There may be a single, common signal-collecting circuit configured to collect not only the TEO signals produced by the monitor circuits associated with register circuits that on said processing paths follow logic units belonging to the first class but also the TEO signals produced by monitor circuits associated with register circuits that follow logic units belonging to any other class than said first class. However, it may be advantageous to have at least some separate detection capability for timing events taking place in the delay critical register circuits (signal-collecting circuit 801) and for timing events taking place in those register circuits that are only preceded by a critical amount of processing path (signal-collecting circuit 802). The detected timing events may be utilized for adapting the operation of the microelectronic circuit or parts thereof, and such adapting may take place in accordance with different adaptation rules based on the number of timing events (if any) observed in the delay critical register circuits per unit time and the number of timing events (if any) observed in the other register circuits per unit time.

In order to be adaptive, a microelectronic circuit must comprise one or more adaptive processing paths. A processing path is an adaptive processing path if one or more of its circuit elements is adaptive, so that said processing path becomes adaptively responsive to values of operating parameters made available to said one or more circuit elements.

In FIG. 8 block 803 represents schematically the capability of the microelectronic circuit to adapt operation of at least a part thereof. This is done by making an operating parameter of the microelectronic circuit assume operating parameter values according to a first adaptation rule in response to the timing event observation signals collected through the first signal-collecting circuit 801 and according to a second adaptation rule in response to the timing event observation signals collected through the second signal-collecting circuit 802.

Adapting the operation of the microelectronic circuit or a part thereof can be accomplished also in those embodiments in which the monitoring units are not monitor-equipped register circuits but for example replica paths. This may involve for example making an operating parameter of the microelectronic circuit assume operating parameter values according to a first adaptation rule in response to anomalous operation detected through replica paths of a first group and according to a second adaptation rule in response to anomalous operation detected through replica paths of a second group.

More elaborate strategies of placing register circuits or other monitoring units and collecting TEO signals or other indications of anomalous operation are possible. As an example we may consider a case in which step 706 in FIG. 7 comprises placing monitor circuits on the basis of two different threshold amounts of preceding processing path. First, monitor circuits may be placed to one subset of register circuits that were not classified as delay critical in step 703 but on the processing paths are preceded by at least a first threshold amount of processing path without monitor-circuit-equipped register circuits. Then monitor circuits may be placed to another subset of register circuits that were not classified as delay critical register circuits in step 703 but on the processing paths are preceded by at least a second threshold amount, different than said first amount, of processing path without monitor-circuit-equipped register circuits. The method may comprise adding a first signal-collecting circuit to collect signals from outputs of the monitor circuits placed to register circuits of said first-mentioned subset, and adding a second signal-collecting circuit to collect signals from outputs of the monitor circuits placed to register circuits of said subsequently mentioned subset.

The more there are signal-collecting circuits, collecting TEO signals from differently placed monitor circuits, the more versatile are the possibilities of adapting the operation of the microelectronic circuit on the basis of detected timing events. An example of adapting the operation of the microelectronic circuit is Advanced (or Adaptive) Voltage Scaling, known as AVS. Basically it means that if more timing events or other indications of anomalous operation are detected, the operating voltage of the adaptive parts of the microelectronic circuit must be increased, and vice versa. If there are different signal-collecting circuits like the ones described above, different thresholds for the acceptable number of timing events or other indications of anomalous operation per unit time may be applied depending on where the anomalies were observed. Also the operating mode of the microelectronic circuit may have an effect: for example the AVS control arrangement may decide not to reduce the operating voltage even if there are no timing events observed in delay critical register circuits and very few in the other register circuits, if the microelectronic circuit is in a standby mode. This is because standby mode means that there is very little processing of data going on, so the low number of detected timing events might not alone tell the whole story.

Above with reference to FIG. 1 it was already mentioned that the microelectronic circuit may be DFT, i.e. Designed For Testability or Design-For-Testing. For this purpose the microelectronic circuit may comprise a test input arrangement that is configured to controllably feed test input signals consisting of test input values into a plurality of circuit elements of at least one of the processing paths. In register circuits like those in FIGS. 1 and 3 the test input signals would come through the test input SI. The microelectronic circuit may then comprise a test output arrangement that is configured to controllably collect test output values from a plurality of circuit elements of the at least one of said processing paths. The test output arrangement would comprise the scan chains that were mentioned earlier.

An at-speed test can be performed of a processing path that comprises both register circuits with monitor circuits (like in FIG. 1) and register circuits without monitor circuits (like in FIG. 3). The test input signal (i.e. the series of test input values) may be clocked in slowly, while maintaining the TTBEN signal high, which disables time borrowing. Then the TTBEN signal may be brought low, enabling time borrowing, and multiple clock cycles may be provided at the functional logic speed. This is done to capture the timing events; at least as many clock cycles are provided as there are steps from any non-monitored register circuit on the processing path until the next monitor-equipped register circuit on that processing path. The collecting of test output signals may then comprise collecting the TEO signals that may have been caused by timing events that took place during said clock cycles at functional logic speed.

A test output arrangement that enables at-speed testing of an MCCP may be described so that it is configured to controllably collect test output values coming from a piece of processing path on which intermediate stages comprise register circuits not associated with respective monitoring units and a subsequent stage comprises a register circuit associated with a respective monitoring circuit. In other words, at-speed testing of an MCCP may proceed so that a test input signal is first slowly clocked in up to the beginning point of the MCCP. Then as many clock cycles are given at full functional speed as it takes to propagate the test input signal through the MCCP, after which the output of the MCCP is captured as a test output value.

Another test output arrangement that enables at-speed testing of an MCCP may be described so that it is configured to controllably collect test output values coming from a piece of processing path on which at least one intermediate stage comprises a register circuit capable of time borrowing. Here the definition of time borrowing is the one that has also been used above, i.e. the capability of a circuit element to temporarily allow a change in a digital value later than expected, without corrupting the data that is being processed. A register circuit capable of time borrowing thus allows the logic unit preceding it on a processing path to temporarily provide its output value late with respect to the triggering signal.

The concepts of DFT and adaptivity may be combined. On a system level, i.e. concerning the whole microelectronic circuit, this means that the test result can be used to select and set one or more new values for one or more operating parameters of the adaptive microelectronic circuit or a part thereof. On the level of a circuit element the same applies, so that testing a circuit element or a number of circuit elements may enable selecting and setting one or more new values for one or more operating parameters of the circuit element(s).

As an example, executing an at-speed test of an MCCP gives information about whether it can operate appropriately at this clock speed and at the operating voltage that was used during the test. If yes, and particularly if the result of the test was acceptable with a wide margin, the clock frequency can be increased and/or the operating voltage can be lowered. On the level of circuit elements an additional example of a parameter the value of which may be changed on the basis of the test result is the length of the time window during which timing events are detected. Adapting the length of the time window may be done by changing the delay between the CP and CPD signals.

If MCCPs of a microelectronic circuit were found, and used as the basis for placing at least some of the monitor circuits of that microelectronic circuit, and if these MCCPs are additionally DFT, there appears the possibility of using these features for characterization. As a concept, characterizing a microelectronic circuit, a processing path, or a circuit element means verifying and quantifying its performance under different operating conditions in relation to a target performance. Characterizing an MCCP may be used for example to verify, whether the number and location of the monitor circuits that were placed in accordance with step 706 in FIG. 7 are sufficient to make the processing path operate as desired.

Characterization may proceed for example in the following way. The microelectronic circuit is put into test mode, and a number of tests are executed according to the DFT methodology, varying the values of operating parameters like the size (i.e. length in time) of the monitoring window or the amount of time borrowing needed in one or more intermediate stages of one or more processing paths. Optimal values for the operating parameters may be found this way; an optimal value is a value that causes not more than an acceptable number of events in the tests while simultaneously minimizing the amount of operating power or other resource, and/or maximizing performance in terms of clock speed or other measure. When the optimal value(s) have been found, these are stored for use in normal operating mode, and the microelectronic circuit is returned from DFT mode to normal operating mode.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:
1. Microelectronic circuit, comprising:
a plurality of logic units and register circuits, said logic units and register circuits arranged into a plurality of processing paths, and
a plurality of monitoring units associated with respective ones of said processing paths, each of said monitoring units configured to produce an observation signal as a response to anomalous operation of the respective processing path;

wherein each of said plurality of logic units belongs to one of a plurality of delay classes according to an amount of delay that it is likely to generate, wherein said delay classes comprise first, second, and third classes, of which the first class covers logic units that are likely to generate longest delays, the second class covers logic units that are likely to generate shorter delays than said first class, and the third class covers logic units that are likely to generate shorter delays than said second class, wherein at least some of said plurality of processing paths comprise logic units belonging to said second class but are without monitoring units, and wherein at least some of said plurality of processing paths comprise logic units belonging to said third class but have monitoring units associated with them.

2. Microelectronic circuit according to claim 1, wherein said monitoring units comprise a plurality of monitor circuits associated with respective ones of said plurality of register circuits, each of said monitor circuits configured to produce a respective timing event observation signal as a response to a change in a digital value at an input of the respective register circuit that took place later than an allowable time limit defined by a triggering signal to said respective register circuit, wherein at least some of the register circuits that on said processing paths follow logic units belonging to said second class are without monitor circuits, and wherein at least some of said monitor circuits are associated with register circuits that on said processing paths follow logic units belonging to said third class.

3. A microelectronic circuit according to claim 1, wherein at least some of said processing paths are adaptive processing paths the performance of which is configurable by making an operating parameter of the microelectronic circuit assume an operating parameter value.

4. A microelectronic circuit according to claim 2, comprising:

a first signal-collecting circuit configured to collect at least the timing event observation signals produced by the monitor circuits associated with register circuits that on said processing paths follow logic units belonging to said first class.

5. A microelectronic circuit according to claim 4, wherein said first signal-collecting circuit is configured to also collect the timing event observation signals produced by the monitor circuits associated with register circuits that on said processing paths follow logic units belonging to any other class than said first class.

6. A microelectronic circuit according to claim 4, comprising:

a second signal-collecting circuit configured to collect the timing event observation signals produced by the monitor circuits associated with register circuits that on said processing paths follow logic units belonging to at least one of said second and third classes.

7. A microelectronic circuit according to claim 6, configured to:

collect timing event observation signals through said first signal-collecting circuit, collect timing event observation signals through said second signal-collecting circuit, adapt operation of at least a part of the microelectronic circuit by making an operating parameter of the microelectronic circuit assume operating parameter values according to a first adaptation rule in response to the timing event observation signals collected through said first signal-collecting circuit, and adapt operation of at least a part of the microelectronic circuit by making said operating parameter of the microelectronic circuit assume operating parameter values according to a second adaptation rule in response to the timing event observation signals collected through said second signal-collecting circuit.

8. A microelectronic circuit according to claim 7, wherein said first adaptation rule is based on a first number of timing event observation signals per unit time collected through said first signal-collecting circuit, and said second adaptation rule is based on a second, different number of timing event observation signals per unit time collected through said second signal-collecting circuit.

9. A microelectronic circuit according to claim 1, comprising:

a test input arrangement configured to controllably feed test input signals consisting of test input values into a plurality of circuit elements of at least one of said processing paths, and a test output arrangement configured to controllably collect test output values from said plurality of circuit elements of said at least one of said processing paths.

10. A microelectronic circuit according to claim 9, wherein at least some of said processing paths are adaptive processing paths the performance of which is configurable by making an operating parameter of the microelectronic circuit assume an operating parameter value, and wherein the microelectronic circuit comprises an operating parameter value selector configured to select said operating parameter value on the basis of said collected test output values.

11. A microelectronic circuit according to claim 9, wherein said test output arrangement is configured to selectively collect said test output values from at least one of: data outputs of said plurality of register circuits, timing event observation signal outputs of said plurality of monitor circuits.

12. A microelectronic circuit according to claim 9, wherein said test output arrangement is configured to controllably collect test output values coming from a piece of processing path on which intermediate stages comprise register circuits not associated with respective monitoring units and a subsequent stage comprises a register circuit associated with a respective monitoring circuit.

13. A microelectronic circuit according to claim 9, wherein said test output arrangement is configured to controllably collect test output values coming from a piece of processing path on which at least one intermediate stage comprises a register circuit capable of time borrowing.

14. A microelectronic circuit according to claim 1, in which at least some of the monitoring units comprise replica paths configured to simulate the operation of a corresponding one of said plurality of processing paths with known input data.

* * * * *

UNITED STATES PATENT AND TRADEMARK OFFICE
CERTIFICATE OF CORRECTION

PATENT NO. : 11,699,012 B2
APPLICATION NO. : 17/297623
DATED : July 11, 2023
INVENTOR(S) : Navneet Gupta It is certified that error appears in the above-identified patent and that said Letters Patent is hereby corrected as shown below:

In the Claims

In Column 16, Line 62, Claim 1, delete "Microelectronic" and insert -- A microelectronic --, therefor.

In Column 17, Line 20, Claim 2, delete "Microelectronic" and insert -- A microelectronic --, therefor.

Signed and Sealed this
Fourteenth Day of November, 2023

Katherine Kelly Vidal
*Director of the United States Patent and Trademark Office*